US006836574B2

(12) United States Patent
Shioda et al.

(10) Patent No.: US 6,836,574 B2
(45) Date of Patent: Dec. 28, 2004

(54) OPTICAL DOMAIN OPTICAL SIGNAL SAMPLING DEVICE

(75) Inventors: Ryu Shioda, Tokyo (JP); Norihide Yamada, Kokubunji (JP)

(73) Assignee: Agilent Technologies, Inc., Palo Alto, CA (US)

( * ) Notice: Subject to any disclaimer, the term of this patent is extended or adjusted under 35 U.S.C. 154(b) by 71 days.

(21) Appl. No.: 10/360,958

(22) Filed: Feb. 7, 2003

(65) Prior Publication Data

US 2004/0156573 A1 Aug. 12, 2004

(51) Int. Cl.$^7$ .......................... G02F 1/035; H04B 10/08
(52) U.S. Cl. .......................... 385/2; 385/1; 385/40; 385/41; 385/14; 385/129; 398/25; 398/33; 398/82; 398/90
(58) Field of Search .......................... 385/1, 2, 3, 14, 385/31, 39, 40, 42, 129, 130; 398/25, 82, 90, 30, 33

(56) References Cited

U.S. PATENT DOCUMENTS

| | | | |
|---|---|---|---|
| 3,917,943 A | | 11/1975 | Auston .................. 250/211 J |
| 5,955,875 A | * | 9/1999 | Twichell et al. .............. 324/96 |
| 6,028,424 A | * | 2/2000 | Twichell et al. .............. 324/96 |
| 6,046,838 A | * | 4/2000 | Kou et al. .................. 359/245 |
| 6,118,396 A | * | 9/2000 | Song .......................... 341/137 |
| 6,647,185 B2 | * | 11/2003 | Hajjar et al. .................. 385/48 |
| 6,700,517 B1 | * | 3/2004 | Kellar ........................ 341/137 |

FOREIGN PATENT DOCUMENTS

| | | | |
|---|---|---|---|
| JP | 2-311722 | 12/1990 | ................ 385/2 X |
| WO | WO89/07833 | 8/1989 | ................ 385/2 X |

* cited by examiner

Primary Examiner—Brian M. Healy
(74) Attorney, Agent, or Firm—Ian Hardcastle (57) ABSTRACT

The optical domain optical signal sampling device comprises an electrical sampling pulse source and an electrically-controlled optical modulator. The electrically-controlled optical modulator comprises electro-optical material, an optical waveguide located in the electro-optical material and including a bifurcated region, and electrodes disposed along the bifurcated region. The optical waveguide is arranged to receive an optical signal-under-test. At least one of the electrodes is connected to receive electrical sampling pulses from the electrical sampling pulse source. The electrical sampling pulses generate an electric field between the electrodes that differentially changes the refractive index of the electro-optical material in the bifurcated region of the optical waveguide to sample the optical signal-under-test.

26 Claims, 5 Drawing Sheets

OPTICAL DOMAIN OPTICAL SIGNAL SAMPLING DEVICE

BACKGROUND OF THE INVENTION

Optical signals are becoming increasingly prevalent in transmitting information signals such as audio, video and data signals. Accordingly, there is an increasing need to characterize such optical signals. Conventionally, an optical signal has been characterized by converting it to an electrical signal, and characterizing the electrical signal as a proxy for the original optical signal. However, the conversion process introduces errors and uncertainty in the characterization of the optical signal.

As an alternative to the electrical conversion process described above, it has been proposed to characterize an optical signal by sampling the optical signal in the optical domain. An example of an optical domain optical signal sampling device is disclosed in Japanese Patent Publication H6-63869B, in which optical sampling pulses and the optical signal to be characterized, which will be called the signal-under-test, are subject to wavelength mixing using a non-linear optical crystal. Specifically, optical domain sampling is performed by controlling the polarization direction of the signal-under-test, spatially overlapping the signal-under-test and the optical sampling pulses and passing the overlapped signal through a non-linear optical material. The resulting optical samples pass from the non-linear optical material to a photodetector. The waveform of the signal-under-test is then determined from the electrical signal generated by the photodetector.

The optical domain optical signal sampling device just described has a very low conversion efficiency because of its use of a non-linear optical crystal. The shortcomings of a very low conversion efficiency can be overcome, to some extent, by using optical sampling pulses having a very high intensity. However, light sources capable of generating short-duration optical pulses with a sufficient intensity are not readily available at an economic price. Accordingly, the optical domain optical signal sampling device just described does not lend itself to practical applications.

Accordingly, what is needed is an optical domain optical signal sampling device that provides a high conversion efficiency and that is practical to manufacture.

SUMMARY OF THE INVENTION

The invention provides an optical domain optical signal sampling device that comprises an electrical sampling pulse source and an electrically-controlled optical modulator. The electrically-controlled optical modulator comprises electro-optical material, an optical waveguide located in the electro-optical material and including a bifurcated region, and electrodes disposed along the bifurcated region. The optical waveguide is arranged to receive an optical signal-under-test. At least one of the electrodes is connected to receive electrical sampling pulses from the electrical sampling pulse source. The electrical sampling pulses generate an electric field between the electrodes that differentially changes the refractive index of the electro-optical material in the bifurcated region of the optical waveguide to sample the optical signal-under-test.

The electrical sampling pulse source may include a photoconductive switch having an output connected to at least one of the electrodes of the electrically-controlled optical modulator. The photoconductive switch is operable to generate the electrical sampling pulses.

The optical domain optical sampling device may additionally comprise a light source operable to generate optical pulses and arranged to illuminate the photoconductive switch with the optical pulses to cause the photoconductive switch to generate the electrical sampling pulses.

The electrically-controlled optical modulator may be a first electrically-controlled optical modulator, and the optical domain optical signal sampling device may additionally comprise a DC bias supply and a second electrically-controlled optical modulator arranged in tandem with the first electrically-controlled optical modulator. The DC bias supply is connected to set the first electrically-controlled optical modulator and the second electrically-controlled optical modulator to opposite states. The electrical sampling pulse source is structured to provide first electrical sampling pulses to the first electrically-controlled optical modulator and second electrical sampling pulses, delayed relative to the first electrical sampling pulses, to the second electrically-controlled optical modulator. The electrical sampling pulses momentarily reverse the states of the first electrically-controlled optical modulator and the second electrically-controlled optical modulator.

The second electrical sampling pulses are delayed relative to the first electrical sampling pulses by less than the pulse width of the electrical sampling pulses.

The optical domain optical signal sampling device may additionally comprise a photodetector coupled to the optical pulse output of the optical waveguide. The photodetector may include a first electrical output, and the optical domain optical signal sampling device may additionally comprise an optical tap, a correction signal generator that includes a serial arrangement of an auxiliary photodetector and a controlled attenuator, and a differential amplifier. The optical tap includes an input arranged to receive the optical signal-under-test, a secondary output, and a main output optically coupled to the electrically-controlled optical modulator. The correction signal generator is optically coupled to the secondary output of the optical tap and includes a second electrical output. The differential amplifier includes inputs electrically connected to the first and second electrical outputs, respectively, and an output that provides electrical samples of the optical signal-under-test and that is additionally connected to the control input of the correction signal generator. The attenuator may be an electrical attenuator or an optical attenuator.

The optical domain optical signal sampling device according to the invention provides a high conversion efficiency and is relatively easy to manufacture.

DETAILED DESCRIPTION OF THE INVENTION

The invention provides an optical domain optical signal sampling device having a relatively simple structure and in which there is no mixing between optical sampling pulses and the optical signal-under-test. Instead, the optical domain optical signal sampling device according to the invention includes an electrical sampling pulse source that creates electrical sampling pulses. The electrical sampling pulses control an electrically-controlled optical modulator that operates as an optical shutter to sample the optical signal-under-test.

The electrical sampling pulse source includes a photoconductive switch. A light source generates optical pulses that control the photoconductive switch to generate the electrical sampling pulses. The photoconductive switch is connected between a DC sampling voltage source and the electrically-controlled optical modulator. Each optical pulse generated by the light source momentarily switches the photoconductive switch ON. This causes the photoconductive switch to generate a corresponding electrical sampling pulse having an amplitude substantially defined by the sampling voltage supplied by the DC sampling voltage source.

The electrically-controlled optical modulator includes an optical waveguide that includes a bifurcated waveguide portion part-way along its length. The optical signal-under-test passes through the optical waveguide and splits into two optical signal portions at the bifurcated waveguide portion. The electrically-controlled optical modulator is biased into its OFF state in which the optical signal portions cancel when they recombine at the end of the bifurcated waveguide portion. Thus, in the OFF state of the electrically-controlled optical modulator, none of the optical signal-under-test passes through the optical waveguide. However, each of the electrical sampling pulses generated by the photoconductive switch and applied to the electrically-controlled optical modulator reduces or substantially eliminates the above-mentioned cancellation of the optical signal portions. Each electrical sampling pulse causes the electrically-controlled optical modulator to allow an optical sample close in amplitude to the original optical signal-under-test to pass through the optical waveguide. The optical samples pass through the optical waveguide to a photodetector, where they are detected to generate an electrical signal.

The light source that generates the optical pulses can be controlled to generate the optical pulses with a specific timing related to the optical signal-under-test to optimize the sampling of the optical signal-under-test. Alternatively, the timing of the optical pulses may be unrelated to the optical signal-under-test.

The optical domain optical signal sampling device according to the invention directly samples the optical signal-under-test, which provides a conversion efficiency close to 100%. Furthermore, an sampling oscilloscope that can characterize both electrical and optical signals can be made using the electrical sampling pulses generated by the electrical sampling pulse source of the optical domain optical signal sampling device additionally to sample an electrical signal-under-test.

Figure 1:
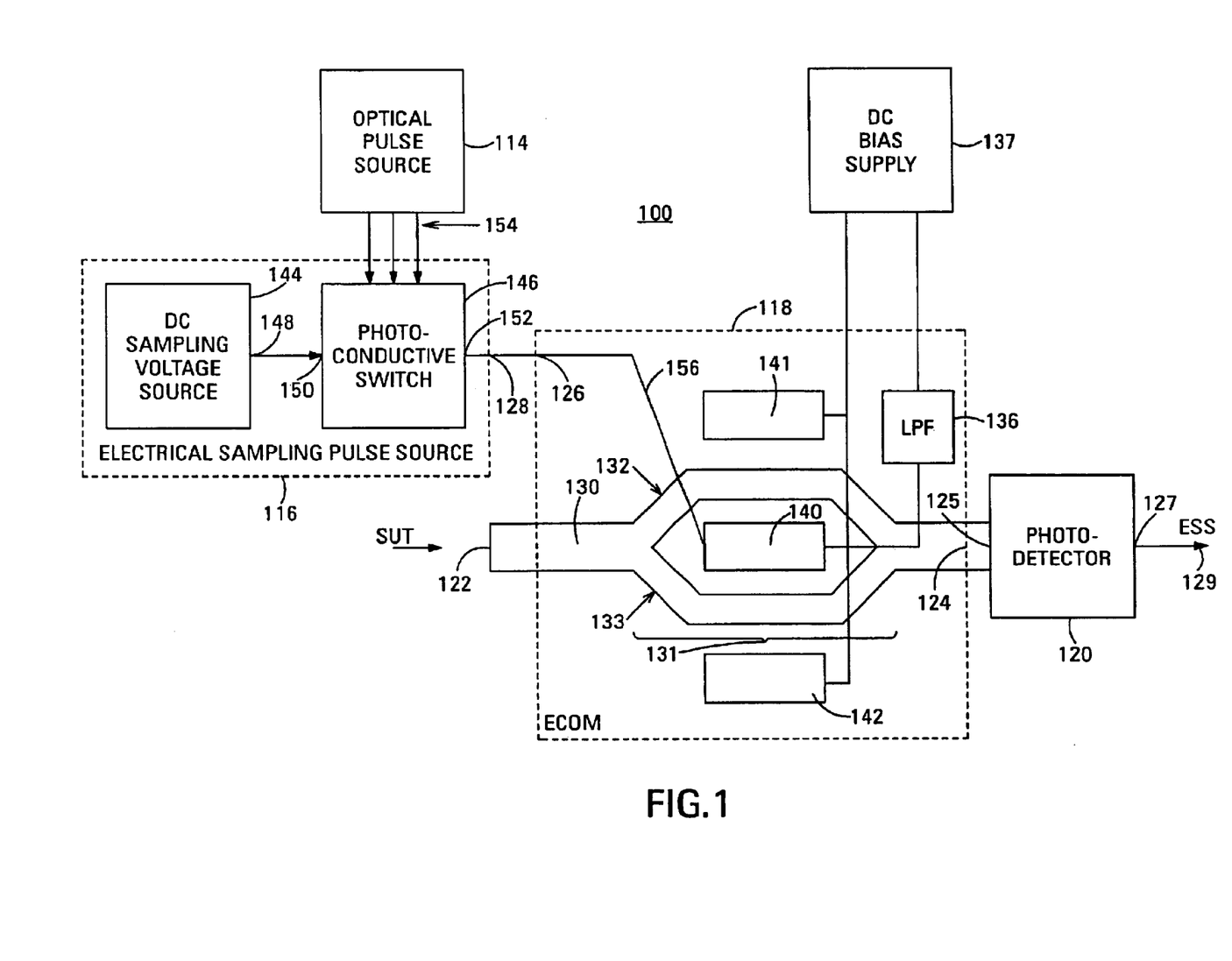
FIG. 1 is a schematic diagram showing a first embodiment of an optical domain optical signal sampling device according to the invention.

Embodiments of the optical domain optical signal sampling device according to the invention will now be described in detail. FIG. 1 is a block diagram showing a first embodiment 100 of an optical domain optical signal sampling device according to the invention. The optical domain optical signal sampling device 100 is composed of the optical pulse source 114, the electrical sampling pulse source 116, the electrically-controlled optical modulator 118 and the photodetector 120.

The electrically-controlled optical modulator 118 includes the optical signal input 122 through which it receives the optical signal-under-test SUT. The electrically-controlled optical modulator also includes the optical sample output 124 optically coupled to the optical input 125 of the photodetector 120. The electrically-controlled optical modulator delivers optical samples of the optical signal-under-test to the photodetector through the optical sample output. The electrically-controlled optical modulator also includes the sampling pulse input 126 electrically connected to the sampling pulse output 128 of the electrical sampling pulse source 116.

The photodetector 120 includes the electrical signal output 127 through which it delivers the electrical sampling signal ESS to the electrical signal output 129 of the optical domain optical signal sampling device 100. The electrical sampling signal ESS is composed of electrical samples generated by the photodetector in response to the samples of the optical signal-under-test received from the electrically-controlled optical modulator 118.

The optical domain optical signal sampling device 100 samples the optical signal-under-test SUT received via the optical signal input 122. The electrically-controlled optical modulator 118 acts as an electrically-controlled optical shutter that samples the optical signal-under-test. The optical samples generated by the electrically-controlled optical modulator are detected by the photodetector 120 to provide the electrical sampling signal ESS that represents the optical signal-under-test.

The electrically-controlled optical modulator 118 includes the optical waveguide 130 that extends from the optical signal input 122 to the optical sample output 124. The optical waveguide may be planar optical waveguide, a 3-dimensional optical waveguide or another suitable type of optical waveguide. The optical waveguide includes an electro-optical material whose refractive index can be changed by an applied electric field.

The optical waveguide 130 includes the bifurcated waveguide portion 131 part-way along its length. The bifurcated waveguide portion is composed of the waveguide portions 132 and 133. The waveguide portions 132 and 133 have similar optical path lengths in the wavelength range of the optical signal-under-test. For example, the waveguide portions have equal optical path lengths. Alternatively, the waveguide portions have optical path lengths that differ by an odd integral multiple of one-half of a wavelength at or near the center of the wavelength range of the optical signal-under-test.

The electrically-controlled optical modulator 118 additionally includes the electrodes 140, 141 and 142. The electrode 140 is located between the waveguide portions 132 and 133, the electrode 141 is located on the opposite side of the waveguide portion 132 from the electrode 140, and the electrode 142 is located on the opposite side of the waveguide portion 133 from the electrode 140. Thus, at least part of the waveguide portion 132 is sandwiched between the electrodes 140 and 141, and at least part of the waveguide portion 133 is sandwiched between the electrodes 140 and 142.

The electrode 140 is electrically connected via the low-pass filter (LPF) 136 to one output terminal of the DC bias supply 137. The electrodes 141 and 142 are electrically connected to one another and to the other output terminal of the DC bias supply.

The DC bias supply 137 applies an electrical potential difference between the electrode 140 and the electrodes 141 and 142 via the low-pass filter 136. The potential difference between the electrodes 140 and 141 applies an electric field across the waveguide portion 132 and that between the electrodes 140 and 142 applies an electric field across the waveguide portion 133.

The optical signal-under-test SUT received at the optical signal input 122 passes through the optical waveguide 130 and, in the bifurcated waveguide portion 131 of the optical waveguide, divides into two optical signal portions that pass through the waveguide portions 132 and 133, respectively. The output voltage of the DC bias supply 137 is set such that the potentials between the electrodes 140 and 141 and between the electrodes 140 and 142 generate electric fields that cause the electro-optical material of the optical waveguide to differentially delay the optical signal portions propagating through the waveguide portions 132 and 133 such that the optical signal portions differ in phase by an odd integral multiple of 180° when they recombine at the end of the bifurcated waveguide portion 131. As a result, when the optical signal portions recombine after passing through the bifurcated waveguide portion 131, they destructively interfere to the extent that substantially complete cancellation occurs, and the intensity of the optical signal-under-test detected by the photodetector 120 is substantially zero. This constitutes the OFF state of the electrically-controlled optical modulator 118. In a practical embodiment, the output voltage of the DC bias supply 137 was set so that the phases of the optical signal portions differed by 180° when the optical signal portions recombined after propagating through the bifurcated waveguide portion 131.

In an example, the electrodes 141 and 142 are set to ground potential, while the DC bias supply 137 sets the electrode 140 to a specific potential, different from ground. This subjects the waveguide portions 132 and 133 to electric fields that are equal in intensity but opposite in direction relative to the direction in which the portions of the optical signal-under-test propagate through the waveguide portions.

Modifying the potential of at least one of the electrodes 140–142 by an external electrical signal, e.g., applying one of the electrical sampling pulses received from the electrical sampling pulse source 116 to the electrode 140, changes the intensities of the electric fields to which the waveguide portions 132 and 133 are subject. As a result, when the optical signal portions recombine after passing through the bifircated waveguide portion 131, their phases differ by an amount different from an odd integral multiple 180°. Complete cancellation between the optical signal portions no longer occurs, and the intensity of the optical signal-under-test detected by the photodetector 120 is greater than zero.

In the embodiment shown, the above-mentioned external electrical signal is provided by the electrical sampling pulses generated by the electrical sampling pulse source 116. Specifically, the electrical sampling pulse output 128 of the electrical sampling pulse source is connected to the electrical sampling pulse input 126 of the electrically-controlled optical modulator 118. The electrical sampling pulse input 126 of the electrically-controlled optical modulator 118 is in turn electrically connected to the electrode 140 by the conductor 156.

Each electrical sampling pulse fed to the electrode 140 changes the electric fields to which the waveguide portions 132 and 133 are subject from their normal state in which the optical portions have opposite phases when they recombine after passing through the bifurcated waveguide portion 131. This change in phase causes the electrically-controlled optical modulator to output an optical sample of the optical signal-under-test in response to each electrical sampling pulse. The resulting optical samples are detected by the photodetector 120.

The amplitude of the electrical sampling pulses generated by the electrical sampling pulse source 116 is set such that, when the electrical sampling pulses are fed to the electrode 140, the resulting electric fields set the phase shift between the optical signal portions substantially to an even integral multiple of 180° when the optical signal portions combine after passing through the bifurcated waveguide portion 131. For example, the amplitude of the electrical sampling pulses may be set such that the phase shift is set substantially to zero when the optical signal portions recombine after passing through the bifurcated waveguide portion 131. Setting the phase shift substantially to an even integral multiple of 180 degrees, including a phase shift of zero, enables the electrically-controlled optical modulator to provide a conversion efficiency approaching 100%.

The example of the electrical sampling pulse source 116 shown in FIG. 1 is composed of the DC sampling voltage source 144 and the photo-conductive switch 146. The photoconductive switch and the optical pulse source 114 are arranged relative to one another such that optical pulses 154 generated by the optical pulse source illuminate the photoconductive switch. The sampling voltage output 148 of the DC sampling voltage source is connected to the input 150 of the photoconductive switch. The output 152 of the photoconductive switch is connected to the electrical sampling pulse output 128 of the electrical sampling pulse source.

The DC sampling voltage source 144 supplies a DC sampling voltage to the sampling voltage input 150 of the photoconductive switch 146. When the optical pulse source 114 supplies the optical pulses 154 to the photoconductive switch, each optical pulse switches the photoconductive switch ON for a time approximately corresponding to the duration of the optical pulse. The photo-conductive switch turns OFF at the end of each optical pulse. Thus, the photo-conductive switch generates an electrical sampling pulse corresponding to each of the optical pulses. The electrical sampling pulses generated by the photo-conductive switch are fed to the sampling pulse input 126 of the electrically-controlled optical modulator 118. The sampling pulse input is connected to the electrode 140 by the conductor 156. In the presence of the electrical sampling pulses, the phase shift between the optical signal portions when they recombine after passing through the bifurcated waveguide portion 131 can be set substantially to an even integral multiple of 180°, as described above, by setting the DC sampling voltage source 144 to provide a specific DC sampling voltage. This phase shift results in a conversion efficiency of close to 100%. A DC sampling voltage different from that which produces a phase shift that is an even integral multiple of 180° can be used, but a lower conversion efficiency will result.

A light source that generates optical pulses with an extremely narrow pulse width is used as the optical pulse source 114. A pulse width of about 1 ps or less is desirable. For example, a mode-locked fiber laser may be as the light source. When the optical pulses 154 generated by the optical pulse source are incident on the photoconductive switch 146, the photoconductive switch generates corresponding electrical sampling pulses having an extremely narrow pulse width (e.g., less than about 2 ps or less). Providing such narrow electrical sampling pulses to the electrically-controlled optical modulator 118 causes the electrically-controlled optical modulator to generate optical samples that are much narrower than can be achieved by prior optical signal sampling systems. This makes possible sampling frequencies as high as at least 200 GHz.

FIG. 1 shows the electrodes 140–142 each as single electrodes. Operation of the optical domain optical signal sampling device 100 is possible with single electrodes, but this requires that the DC sampling voltage be relatively high, in the range from a few dozen volts to over 100 V, for example. Switching such a high voltage incurs the risk that the electrical sampling pulse source 116 will generate electrical sampling pulses that are not narrow enough. To enable a lower DC sampling voltage to be used, at least the electrode 140 may be divided into a tandem arrangement of two or more sub-electrodes. In general, a tandem arrangement of N sub-electrodes allows the DC sampling voltage to be reduced by a factor of $1/\sqrt{N}$ compared with the DC sampling voltage required to produce a given phase change with a single electrode. For example, the electrodes 140–142 may each be composed of a tandem arrangement of ten or more sub-electrodes. The output 152 of the photoconductive switch 146 can branch into a suitable number of parallel electrical conductors, each of which extends to one of the sub-electrodes into which the electrode 140 has been divided. This allows the DC sampling voltage to be reduced to 15 V or less. Other alternatives capable of reducing the DC sampling voltage include using a resonant feed to the electrode 140 and increasing the length of the electrode 140 in the direction of propagation of the optical signal-under-test through the optical waveguide 130.

The optical domain optical signal sampling device 100 can include a substrate (not shown) in and one which the electrically-controlled optical modulator 118 is formed in a suitable substrate, and on which the photo-conductive switch 146 is mounted. The electrical waveguide connection 156 extends over the surface of the substrate from the output of the photo-conductive switch 146 to the electrode 140 of the electrically-controlled optical modulator 118. The electrical waveguide connection is depicted schematically in FIG. 1. The electrical waveguide connection does not necessarily have to end at the electrode 140 as shown in the Figure. The electrical waveguide connection may alternatively extend beyond the electrode 140 so that it additionally crosses the waveguide portion 133. Using the substrate in which the electrically-controlled optical modulator 118 is formed to support at least the photoconductive switch 146 is advantageous in that it facilitates handling and enhances sampling performance. The substrate can additionally be used to support the optical pulse source 114 to illuminate the photoconductive switch 146. An example of such a structure will be described below with reference to FIGS. 5A and 5B.

The optical domain optical signal sampling device 100 described above operates with a high conversion efficiency to generate the electrical sampling signal ESS that accurately represents the optical signal-under-test SUT. However, the accuracy with which the electrical sampling signal represents the optical signal-under-test depends on the ON to OFF intensity ratio of the electrically-controlled optical modulator 118. The accuracy with which the electrical sampling signal represents the optical signal-under-test is impaired by leakage of the optical signal-under-test in the OFF state of the electrically-controlled optical modulator 118.

Figure 2:
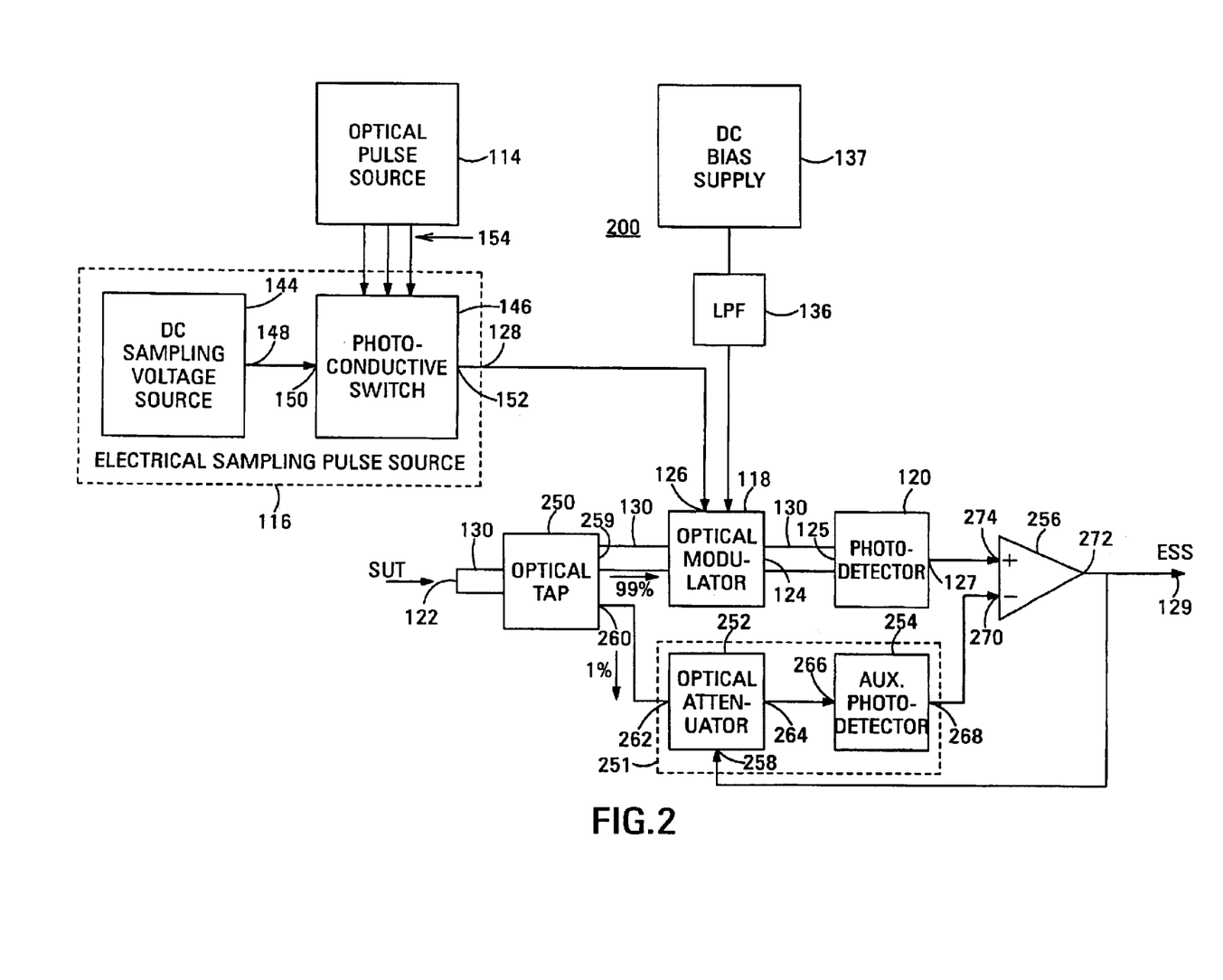
FIG. 2 is a block diagram showing a second embodiment of an optical domain optical signal sampling device according to the invention.

FIG. 2 is a schematic block diagram of a second embodiment 200 of an optical domain optical signal sampling device according to the invention. This embodiment includes elements that operate to cancel the effect of leakage of the optical signal-under-test in the OFF state of the electrically-controlled optical modulator 118. The optical domain optical signal sampling device 200 is based on the optical domain optical signal sampling device 100 described above with reference to FIG. 1. Elements of the optical domain optical signal sampling device 200 that correspond to elements of the optical domain optical signal sampling device 100 are indicated using the same reference numerals and will not be described again here.

In addition to the electrically-controlled optical modulator 118, the electrical sampling pulse source 116, the photodetector 120, the DC bias supply 137 and the low-pass filter 136, the optical domain optical signal sampling device 200 includes the optical tap 250, the correction signal generator 251 and the differential amplifier 256. The correction signal generator is composed of a serial arrangement of an attenuator and an auxiliary photodetector.

The optical tap 250 is located in the optical waveguide 130 between the optical signal input 122 and the electrically-controlled optical modulator 118. Part of the optical waveguide couples the main output 259 of the optical tap to the electrically-controlled optical modulator 118. The output 124 of the electrically-controlled optical modulator is coupled to the optical input 125 of the photodetector 120. The electrical output 127 of the photodetector 120 is connected to the non-inverting input 274 of the differential amplifier 256.

The secondary output 260 of the optical tap 250 is optically coupled to the optical input 262 of the correction signal generator 251. The electrical output 268 of the correction signal generator is connected to the inverting input 270 of the differential amplifier 256.

The output 272 of the differential amplifier is connected to the electrical signal output 129 of the optical domain optical signal sampling device 200, and is additionally connected to the control input 258 of the correction signal generator 251.

In the example shown in FIG. 2, the correction signal generator 251 is composed of a serial arrangement of the electrically-controlled optical attenuator 252 and the auxiliary photodetector 254 in which the optical output 264 of the optical attenuator is optically coupled to the optical input 266 of the auxiliary photodetector. The optical input 262 of the optical attenuator provides the optical input of the correction signal generator, the electrical output 268 of the auxiliary photodetector provides the electrical output of the correction signal generator and the control input 258 of the optical attenuator provides the control input of the correction signal generator.

In a practical embodiment, a matched pair of photodiodes, part no. DSC-R405 from Discovery Semiconductors, Inc. of Princeton Jct., N.J. 08550, was used as the photodetector 120 and the auxiliary photodetector 254.

The optical tap 250 diverts a small fraction of the optical signal-under-test SUT received at the optical signal input 122 to the optical input 262 of the correction signal generator 251. A typical value of the fraction of the optical signal-under-test diverted to the correction signal generator is about 1%. In the correction signal generator, the electrically-controlled optical attenuator 252 attenuates the optical signal received from the optical tap and the auxiliary photodetector 254 generates an electrical signal in response to the optical signal output by the optical attenuator.

The optical attenuator includes a control system (not shown) that sets the attenuation of the optical signal received at the optical input 262 in response to the electrical sampling signal ESS received at the control input 258 from the output 272 of the differential amplifier 256. An increase in the electrical sampling signal causes the control system to decrease the attenuation of the optical signal received at the input 262.

The remainder of the optical signal-under-test SUT passes from the main output 259 of the optical tap 250 through the optical waveguide 130 to the electrically-controlled optical modulator 118. The electrically-controlled optical modulator samples the optical signal-under-test in response to the electrical sampling pulses generated by the electrical sampling pulse source 116, as described above. The resulting optical samples pass from the electrically-controlled optical modulator to the photodetector 120. In response to the optical samples, the photodetector 120 generates an electrical signal composed of electrical samples corresponding to the optical samples. The electrical signal may include a signal component generated by the photo-detector in response to leakage of the optical signal-under-test in the OFF state of the electrically-controlled optical modulator. This signal component will be called the leakage component.

The optical domain optical signal sampling device 200 cancels the effect of leakage of the optical signal-under-test in the OFF state of the electrically-controlled optical modulator 118 by subtracting the electrical correction signal output by the correction signal generator 251 from the electrical signal generated by the photodetector 120 to generate the electrical sampling signal ESS. The electrical correction signal represents a fraction of the optical signal-under-test received at the signal input 122. The electrical sampling signal ESS generated by the differential amplifier 256 is fed back to the control input 258 of the correction signal generator. The electrical sampling signal operates to set the attenuation provided by the attenuator 252 that forms part of the correction signal generator to a level at which the electrical correction signal effectively cancels the leakage component in the electrical signal output by the photodetector 120. To help accomplish this, the time constant of the control system (not shown) of the attenuator 252 is set to a value intermediate between the ON time of the electrically-controlled optical modulator 118 and the time between successive ones of the electrical sampling pulses generated by the electrical sampling pulse source 116. Canceling the effect of the leakage component increases the accuracy with which the electrical sampling signal ESS represents the optical signal-under-test SUT.

The correction signal generator 251 may alternatively be composed of a serial arrangement of an auxiliary photodetector and an electrically-controlled electrical attenuator in which the electrical output of the auxiliary photo-detector is electrically connected to the input of the electrical attenuator. The optical input of the auxiliary photodetector provides the optical input of the correction signal generator, the electrical output of the electrical attenuator provides the electrical output of the correction signal generator and the control input of the electrical attenuator provides the control input of the correction signal generator.

The optical domain optical signal sampling devices 100 and 200 described above sample the optical signal-under-test using electrical sampling pulses having a pulse width defined by the pulse width of the optical pulses generated by the optical pulse source 114 and the switching response of the photoconductive switch 146. Although the pulse width of the optical pulses generated by the optical pulse source can be very narrow, and the photo-conductive switch can have a very fast switching response, the electrical sampling pulses applied to the electrically-controlled optical modulator can have a pulse width that is too large to provide optimum sampling in some applications.

Figure 3:
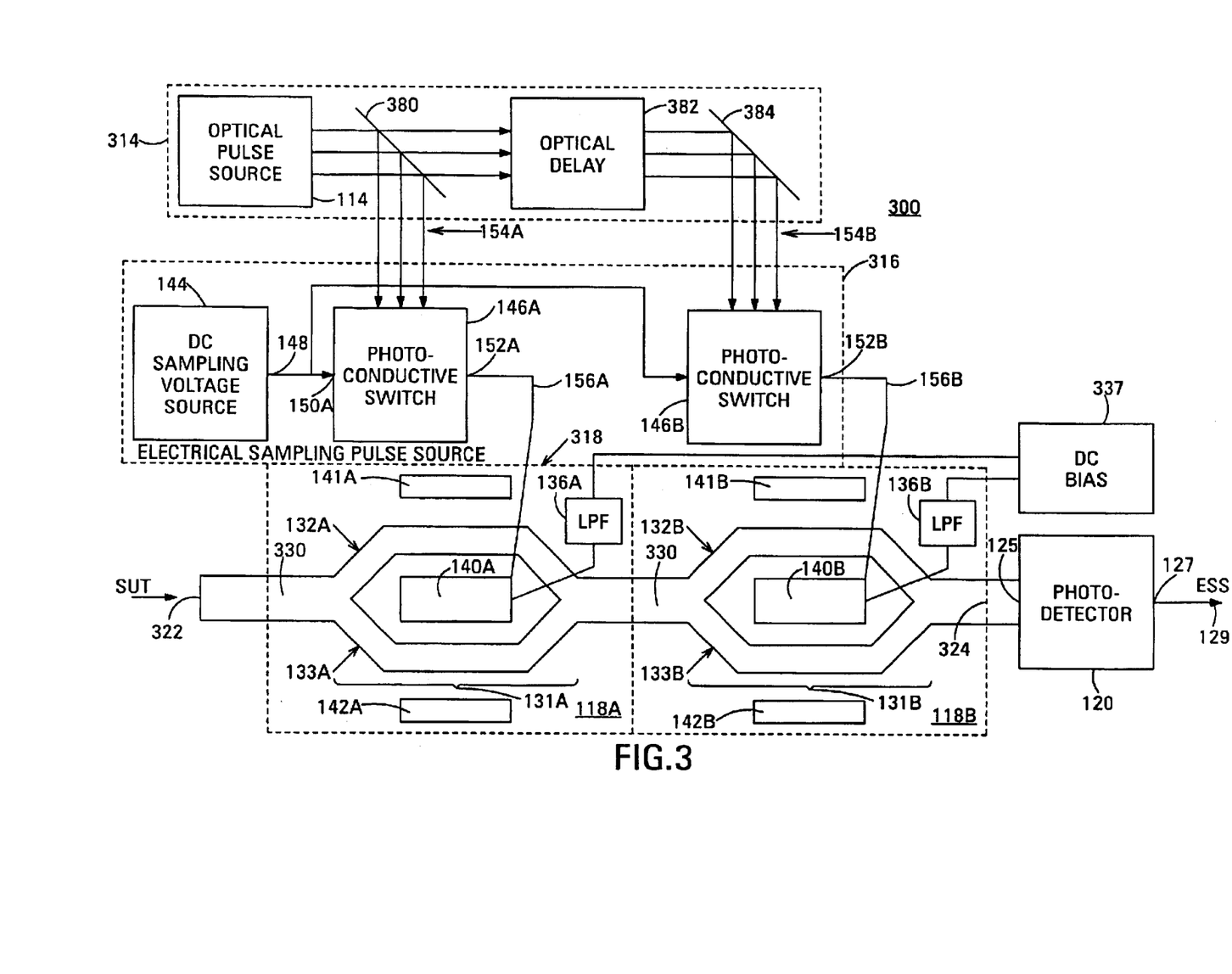
FIG. 3 is schematic diagram showing a third embodiment of an optical domain optical signal sampling device according to the invention.

FIG. 3 is a schematic diagram of a third embodiment 300 of an optical domain optical signal sampling device according to the invention. The optical domain optical signal sampling device 300 samples the optical signal-under-test with an effective sampling pulse width that is substantially shorter than the pulse width of the electrical sampling pulses generated by the electrical sampling pulse source 116 shown in FIGS. 1 and 2. FIG. 4 shows how sampling with an ultra-short effective sampling pulse width is performed in the optical domain optical signal sampling device 300. Elements of the optical domain optical signal sampling device 300 that correspond to elements of the optical domain optical signal sampling device 100 shown in FIG. 1 are indicated using the same reference numerals, which may have an A or a B appended to them, and will not be described again here.

The optical domain optical signal sampling device 300 is composed of the dual optical pulse source 314, the dual electrically-controlled optical modulator 318, the dual electrical sampling pulse source 316, the dual DC bias source 337, the low-pass filters 136A and 136B and the photodetector 120.

The dual electrically-controlled optical modulator 318 is composed of a tandem arrangement of the electrically-controlled optical modulator 118A and the electrically-controlled optical modulator 118B, each of which is substantially identical to the electrically-controlled optical modulator 118 described above with reference to FIG. 1. Elements of the electrically-controlled optical modulators 118A and 118B that correspond to elements of the electrically-controlled optical modulator 118 described above with reference to FIG. 1 are indicated by the same reference numerals with the letters A and B, respectively, appended. However, in the dual electrically-controlled optical modulator 318, the optical waveguide 330 extends from the signal input 122 to the signal output 124 through both of the electrically-controlled optical modulators 118A and 118B, and includes the two bifurcated waveguide portions 131A and 131B.

The dual electrical sampling pulse source 316 is composed of the DC sampling voltage source 144, the photo-conductive switch 146A and the photo-conductive switch 146B. The sampling voltage output 148 of the DC sampling voltage source is connected to the sampling voltage input 150A of the photo-conductive switch 146A and additionally to the sampling voltage input 150B of the photoconductive switch 146B. The output 152A of the photoconductive switch 146A is connected by the electrical waveguide connection 156A to the electrode 140A of the electrically-controlled optical modulator 118A. The output 152B of the photoconductive switch 146B is connected by the electrical waveguide connection 156B to the electrode 140B of the electrically-controlled optical modulator 118B. A dual DC sampling voltage source that supplies independent DC sampling voltages to the photoconductive switches 146A and 146B may be used instead of the single DC sampling voltage source shown.

The dual DC bias supply 337 has one output connected via the low-pass filter 136A to the electrode 140A. The other output of the dual DC bias supply is connected via the low-pass filter 136B to the electrode 140B. The common connection between the dual DC bias supply and the electrodes 141A, 142A, 141B and 142B is omitted to simplify the drawing.

In an embodiment in which, when no potential difference exists between the electrode 140B and the electrodes 141B and 142B, the optical path lengths of the waveguide portions 132B and 133B are matched to within a fraction of a wavelength of the optical signal-under-test SUT, or are otherwise such that the optical signal portions are substantially in phase when they recombine after passing through the bifurcated waveguide portion 131B, a single DC bias supply similar to the DC bias supply 137 may be used instead of the dual DC bias supply 337, and the low-pass filter 136B and the electrical connections between the electrode 140B and the DC bias supply may be omitted.

The dual optical pulse source 314 is composed of the optical pulse source 114 arranged to illuminate the photoconductive switches 146A and 146B with the optical pulses 154A and 154B, respectively. The optical pulses 154B are delayed relative to the optical pulses 154A.

FIG. 3 shows an example in which the dual optical pulse source 314 is composed of the beam splitter 380, the optical delay 382 and the reflector 384. The beam splitter is arranged to receive the optical pulses from the optical pulse source 114 and to reflect about half of the intensity of the optical pulses to illuminate the photoconductive switch 146A. The beam splitter additionally transmits the remainder of the intensity of the optical pulses to the optical delay 382. The optical delay delays the optical pulses received from the beam splitter, and passes the delayed optical pulses to the reflector 384. The reflector reflects the delayed optical pulses to illuminate the photoconductive switch 146B.

The optical delay 382 is shown as a physical element in FIG. 3. However, this is not critical to the invention. A difference of a fraction of a millimeter between the length of the optical path between the optical pulse source 114 and the photoconductive switch 146A and the length of the optical path between the optical pulse source and the photoconductive switch 146B will provide a delay of the appropriate magnitude between the optical pulses 154A and 154B illuminating the photoconductive switches 146A and 146B, respectively. However, this disclosure will regard all of the delay between the optical pulses 154A and 154B as being lumped in the optical delay 382.

The optical signal-under-test SUT is received via the signal input 122 and is sampled by the electrically-controlled optical modulators 118A and 118B. The resulting optical samples are output from the optical waveguide 330 to the photodetector 120 that generates the electrical sampling signal ESS, and feeds the electrical sampling signal to the sampling signal output 129.

One of the bias voltages generated by the dual DC bias supply 337 is set to cause the electrodes 140A–142A to generate electric fields across the waveguide portions 132A and 133A that set the electrically-controlled optical modulator 118A to a normally-OFF state. The other of the bias voltages generated by the dual DC bias supply 337 is set to cause the electrodes 140B–142B to generate electric fields across the waveguide portions 132B and 133B such that the electrically-controlled optical modulator 118B is in a normally-ON state. Thus, the dual DC bias supply sets the electrically-controlled optical modulators 118A and 118B to opposite states.

An electrically-controlled optical modulator is its ON state when the optical signal portions have a phase difference that is an even multiple of 180° when they recombine after passing through the bifurcated waveguide portion constituting part of the electrically-controlled optical modulator. An electrically-controlled optical modulator is its OFF state when the optical signal portions have a phase difference that is an odd multiple of 180° when they recombine after passing through the bifurcated waveguide portion constituting part of the electrically-controlled optical modulator.

The electrical sampling pulses generated by the dual electrical sampling pulse source 316 momentarily reverse the states of the electrically-controlled optical modulators 118A and 118B with a time delay corresponding to the delay between the optical pulses 154A and 154B. The time delay is less than the pulse width of the electrical sampling pulses.

The electrical sampling pulses generated by the photoconductive switch 146A have an amplitude that causes the electrodes 140A–142A to generate electric fields across the waveguide portions 132A and 133A that momentarily set the electrically-controlled optical modulator 118A to its ON state. The electrical sampling pulses generated by the photoconductive switch 146B have an amplitude that causes the electrodes 140B–142B to generate electric fields across the waveguide portions 132B and 133B that momentarily set the electrically-controlled optical modulator 118B to its OFF state.

The dual electrically-controlled optical modulator 318 just described allows the optical domain optical signal sampling device 300 to generate narrower samples of the optical signal-under-test light than the optical domain optical signal sampling devices 100 and 200 shown in FIGS. 1 and 2, respectively.

Figure 4A:
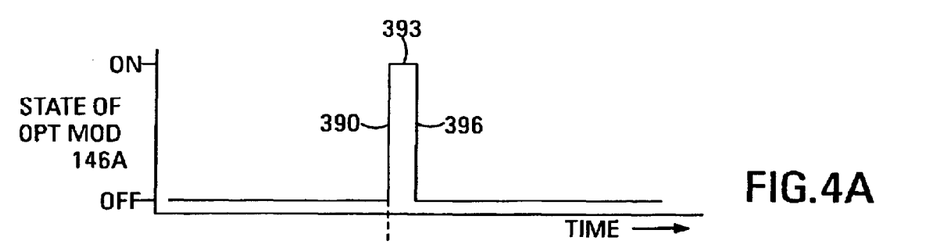
FIG. 4 shows how sampling with an ultra-short effective sampling pulse width is performed in the third embodiment of the optical domain optical signal sampling device according to the invention.

Operation of the dual electrically-controlled optical modulator will now be described with reference to FIGS. 4A–4C. The dual DC bias supply 337 sets the electrically-controlled optical modulators 118A and 118B to opposite states. In the example shown, the electrically-controlled optical modulator 118A is OFF and the electrically-controlled optical modulator 118B is ON. As a result of the OFF state of the electrically-controlled optical modulator 118A, none of the optical signal-under-test SUT received at the signal input 122 passes to the photodetector 120.

The dual optical pulse source 314 generates the optical pulse 154A that illuminates the photoconductive switch 146A and momentarily turns the photoconductive switch 146A ON. The electrical sampling pulse generated by the photoconductive switch 146A in response to the optical pulse 154A momentarily reverses the state of the electrically-controlled optical modulator 118A to ON, as shown at 390 in FIG. 4A.

Figure 4B:
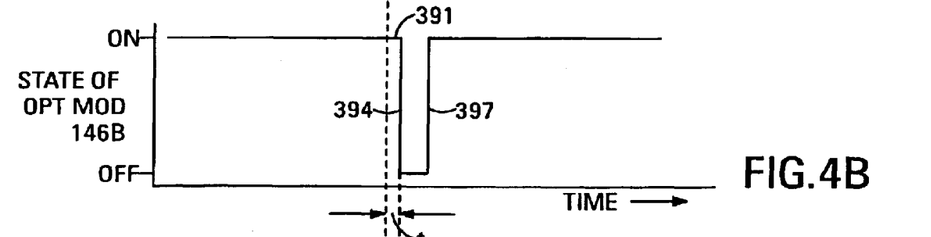
Figure 4C:
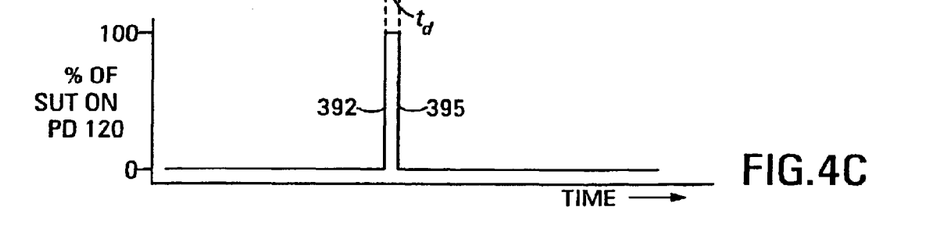

The electrically-controlled optical modulator 118B is normally ON, and so is ON, as shown at 391 in FIG. 4B, when the electrically-controlled optical modulator 118A turns ON. Accordingly, the optical signal-under-test SUT passes through the electrically-controlled optical modulator 118A and additionally through the electrically-controlled optical modulator 118B to the photodetector 120 as shown at 392 in FIG. 4C.

After generating the optical pulse 154A that illuminates the photo-conductive switch 146A, and while the electrically-controlled optical modulator 118A is still ON, as shown at 393 in FIG. 4A, the dual optical pulse source 314 generates the optical pulse 154B that illuminates the photo-conductive switch 146B and momentarily turns the photo-conductive switch 146B ON. The electrical sampling pulse generated by the photoconductive switch 146B in response to the optical pulse 154B momentarily reverses the state of the electrically-controlled optical modulator 118B to OFF, as shown at 394 in FIG. 4B. The OFF state of the electrically-controlled optical modulator 118B stops the optical signal-under-test from passing to the photodetector 120, as shown at 395 in FIG. 4C. The OFF state of the electrically-controlled optical modulator 118B stops the optical signal-under-test from passing to the photodetector even though the electrically-controlled optical modulator 118A remains ON for some time after the electrically-controlled optical modulator 118B is switched OFF.

At the end of the optical pulse 154A, the electrical sampling pulse generated by the photoconductive switch 146A ends, and the electrically-controlled optical modulator 118A returns to its normally-OFF state, as shown at 396 in FIG. 4A. Then, at the end of the optical pulse 154B, the electrical sampling pulse generated by the photoconductive switch 146B ends, and the electrically-controlled optical modulator 118B returns to its normally-ON state, as shown at 397 in FIG. 4B. However, neither of these events results in the optical signal-under-test reaching the photodetector 120.

The duration of the optical samples generated by the dual electrically-controlled optical modulator 318 is defined by the delay td between the electrically-controlled optical modulator 118A turning ON and the electrically-controlled optical modulator 118B turning OFF, rather than by the pulse width of the electrical sampling pulses generated by either of the photoconductive switches 146A and 146B. The delay between the electrically-controlled optical modulator 118A turning ON and the electrically-controlled optical modulator 118B turning OFF is approximately equal to the delay between the optical pulses 154A and 154B. Therefore, the optical domain optical signal sampling device 300 can generate extremely narrow samples whose pulse width is determined by the delay between the optical pulses 154A and 154B.

The optical domain optical signal sampling device 300 is described above with reference to an example in which the electrically-controlled optical modulator 118A is normally OFF and the electrically-controlled optical modulator 118B is normally ON. However, this is not critical to the invention. The same effect can be obtained with the electrically-controlled optical modulator 118A being normally ON and the electrically-controlled optical modulator 118B being normally OFF. In this case, the optical sample is delayed by the pulse width of the electrical sampling pulses relative to the optical sample shown in FIG. 4C. Moreover, the order of the electrically-controlled optical modulators 118A and 118B along the optical waveguide 330 can be reversed. Finally, a tandem arrangement of more than two electrically-controlled optical modulators driven by electrical sampling pulses having different delays with respect to one another may be used.

The optical domain optical signal sampling device 300 is described above with reference to an example in which the delay between the electrical sampling pulses is obtained by using two photoconductive switches illuminated by optical pulses that are delayed relative to one another. However, this is not critical to the invention. The delay between the electrical sampling pulses may alternatively be obtained by using a single photoconductive switch and by feeding the electrical sampling pulses from the photoconductive switch to the electrically-controlled optical modulators 118A and 118B by electrical paths having different path lengths.

Figure 5A:
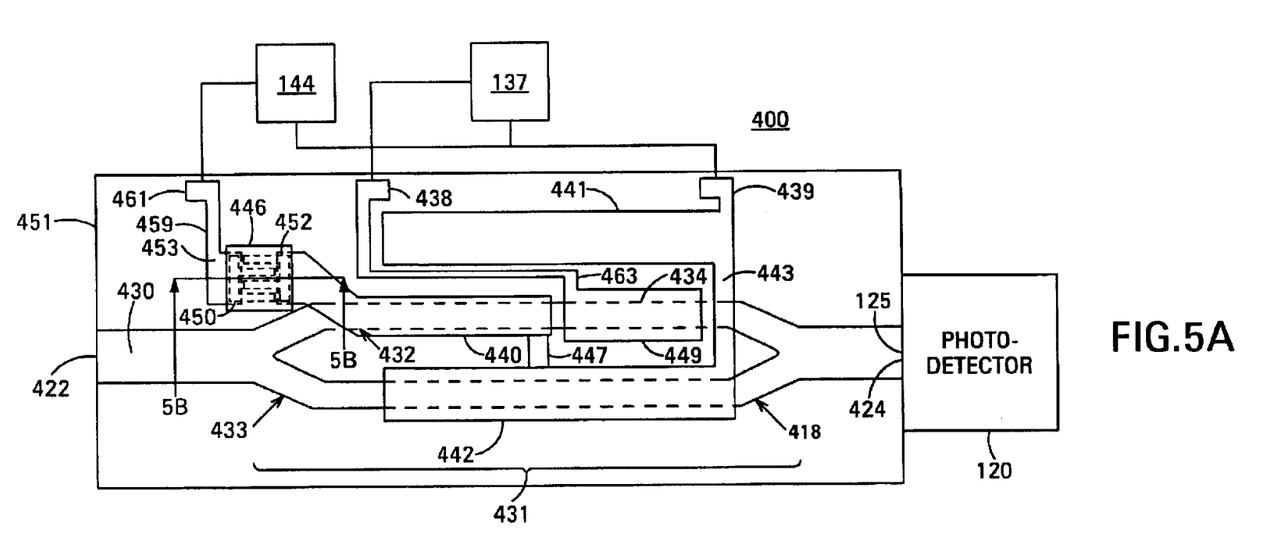
FIG. 5A is a plan view of a practical example of the optical domain optical signal sampling device shown in FIG. 1.
Figure 5B:
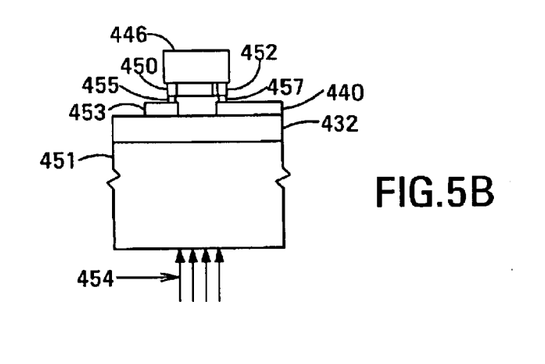
FIG. 5B is cross-sectional view of a practical example of the optical domain optical signal sampling device shown in FIG. 1, taken along the line 5B—5B in FIG. 5A.

FIGS. 5A and 5B show a practical example 400 of an optical domain optical signal sampling device according to the invention. The practical example is based on the first embodiment of the optical domain optical signal sampling device according to the invention described above with reference to FIG. 1. This example includes specific arrangements for feeding the electrical sampling pulses to the electrode of the electrically-controlled optical modulator. These arrangements help preserve the amplitude and short duration of the electrical sampling pulses applied to the electrode, and include coupling the output of the photoconductive switch directly to the electrode and employing additional electrode to apply the output of the DC bias supply to set the electrically-controlled optical modulator to its normally OFF state.

Corresponding practical examples may be based on the embodiments described above with reference to FIGS. 2 and 3, and so such practical examples will not be described here. It will also be apparent to a person of ordinary skill in the art that the practical example 400 of an optical domain optical signal sampling device according to the invention may additionally include an optical pulse source mounted to illuminate the photoconductive switch that forms part of the optical domain optical signal sampling device.

The optical domain optical signal sampling device 400 is built on and in the substrate 451. The substrate is a piece of electro-optical material having a length of several tens of mm. The material of the substrate is lithium niobate ($LiNbO_3$), specifically, z-cut lithium niobate supplied by Sumitomo Osaka Cement Co. of Japan. X-cut lithium niobate may alternatively be used. Other electro-optical materials that may be used as the substrate include lithium tantalate, potassium dihydrogen phosphate, potassium dideuterium phosphate, aluminum dihydrogen phosphate, aluminum dideuterium phosphate, barium sodium niobate and potassium lithium tantalate niobate (KLTN). Suitable alternatives to these materials are known in the art and other suitable materials may become available in the future.

The optical waveguide 430 is formed in the substrate 451 by doping a portion of the substrate having the desired shape of the optical waveguide with an index-increasing impurity. The doping was performed by thermally diffusing titanium into the substrate, as is known in the art. Other techniques may alternatively be used.

The optical waveguide 430 extends from the optical signal input 422 to the optical sample output 424. An optical fiber (not shown) is coupled to the optical signal input of the optical waveguide to supply the optical signal-under-test to the optical domain optical signal sampling device 400. The photo-detector 120 is coupled to the substrate 451 with its optical input 125 aligned with optical sample output 424 of the optical waveguide. Alternatively, an optical fiber (not shown) may be coupled to the optical sample output to convey the optical samples output by the optical waveguide to the optical input of the photodetector.

The optical waveguide 430 is formed to include the bifurcated waveguide portion 431 located part-way along its length. The bifurcated waveguide portion is composed of the waveguide portions 432 and 433 having substantially equal optical path lengths.

The electrodes 440, 441, 442 and 449 are located on the surface of the substrate 451. In this example in which the material of the substrate is z-cut, the electrodes 440 and 449 are located in tandem over at least part of the waveguide portion 432, the electrode 441 is located adjacent at least part of the waveguide portion 432, remote from the waveguide portion 433, and the electrode 442 is located over at least part of the waveguide portion 433. In embodiments in which the material of the substrate is x-cut, the electrodes 440 and 449 are located between the waveguide portions 432 and 433, and the electrodes 441 and 442 are located on the opposite sides of the waveguide portions 432 and 433, respectively, from the electrode 440 in an arrangement similar to that shown in FIG. 1.

The electrode 441 is connected to the electrode 442 by the conductor 443. The electrode 441 is also connected to the pad 439. The pad 439 provides an electrical connection to ground.

The end of the electrode 440 remote from the electrode 449 extends over the surface of the substrate 451 a short distance substantially diagonally away from the optical waveguide 430. The pad 453 is located on the surface of the substrate opposite the extended end of the electrode 440, and separated therefrom by a gap. The conductor 459 extends over the surface of the substrate to connect the pad 453 to the pad 461. The pad 461 provides an electrical connection to the DC sampling voltage source 144.

The photoconductive switch 446 is mounted on a portion of the substrate 451 outside the optical waveguide 430 with its output directly connected to the electrode 440. In the example shown, the photoconductive switch 446 is mounted using flip-chip bonding. The input electrode 450 of the photoconductive switch is mechanically and electrically connected to the pad 453 and the output electrode 452 of the photoconductive switch is mechanically and electrically connected to the extended end of the electrode 440. FIG. 5B shows mechanical and electrical connection 455 extending between the pad 453 and the input electrode 450, and the mechanical and electrical connection 457 extending between the output electrode 452 and the electrode 440. The mechanical and electrical connections were made using silver paste. Alternatively, the mechanical and electrical connections may be made by solder bumps, solder paste, silver paste, a conductive adhesive or some other suitable conductive material capable of bonding with the materials of the electrodes 440, 450 and 452 and the pad 453.

The end of the electrode 440 adjacent the electrode 449 is connected to ground by the termination resistor 447. In the example shown, the termination resistor is connected to the electrode 442, which is grounded, and has a resistance of 50 Ω.

The electrode 449 is arranged in tandem with the electrode 440 and is electrically connected to the pad 438 by the conductor 463 that extends over the surface of the substrate 451. The pad 438 provides an electrical connection to the DC bias supply 137. The tandem arrangement of the electrodes 440 and 449 enables the output of the photoconductive switch 446 to be connected to the electrode 440 independently of the connection between the DC bias supply and the electrode 449. This helps preserve the amplitude and short duration of the electrical sampling pulses generated by the photoconductive switch by eliminating the connection between the electrode 440 and the DC bias supply.

The material of the substrate 451 is transparent at the wavelength of the optical pulses 454 so that the optical pulses pass through the substrate and the gap between the pad 453 and the electrode 440 to illuminate the photoconductive switch 446. This enables the optical pulse source (not shown) to be mounted on the surface of the substrate remote from the surface on which the photoconductive switch is mounted. When the material of the substrate is opaque at the wavelength of the optical pulses, the optical pulse source may be mounted to illuminate the surface of the photoconductive switch remote from the surface on which the input and output electrodes 450 and 452, respectively, are located. This may require that the thickness of the portion of the substrate underlying the electrodes be reduced to reduce attenuation of the optical pulses by the photoconductive switch substrate.

The various electrodes, conductors and pads described above are formed by selectively depositing a thin layer of suitable metal on the surface of the substrate 451 and then employing plating techniques to deposit about 20 Fm of gold on at least the electrodes 440–442 and 449. The thick layer of gold reduces the electrical resistance of the electrodes.

In a practical embodiment of the optical domain optical signal sampling device 300 shown in FIG. 3 based on the structure shown in FIG. 5, each of the electrically-controlled optical modulators corresponding to the electrically-controlled optical modulators 118A and 118B shown in FIG. 3 may include its own photoconductive switch directly connected to an electrode in an arrangement similar to that shown in FIG. 5. Light from a common optical pulse source is fed through optical paths of different optical path lengths to illuminate the photoconductive switches with optical pulses that are delayed with respect to one another.

Alternatively, a single photoconductive switch may be mounted on the substrate 451 in a location opposite the portion of the optical waveguide that connects the two bifurcated waveguide portions. The electrodes 440 of the two electrically-controlled optical modulators are arranged to be adjacent one another. In other words, the order of the electrodes 440 and 449 along the optical waveguide in the electrically-controlled optical modulator corresponding to electrically-controlled optical modulator 118A is opposite to that shown in FIG. 5A whereas the order is the same as that shown in FIG. 5A in the electrically-controlled optical modulator corresponding to the electrically-controlled optical modulator 118B. The output of the photo-conductive switch is connected to the electrodes of both electrically-controlled optical modulators by short striplines. Locating the photoconductive switch asymmetrically between the electrically-controlled optical modulators makes the striplines differ in length. The different-length striplines delay the electrical sampling pulses fed to the electrically-controlled optical modulators by different amounts.

Although this disclosure describes illustrative embodiments of the invention in detail, it is to be understood that the invention is not limited to the precise embodiments described; and that various modifications may be practiced within the scope of the invention defined by the appended claims.

We claim:

1. An optical domain optical signal sampling device, comprising:
   an electrical sampling pulse source; and
   an electrically-controlled optical modulator comprising electro-optical material, an optical waveguide located in the electro-optical material and including a bifurcated region, and electrodes disposed along the bifurcated region, the optical waveguide arranged to receive an optical signal-under-test, at least one of the electrodes connected to receive electrical sampling pulses from the electrical sampling pulse source, the electrical sampling pulses generating between the electrodes an electric field that differentially changes the refractive index of the electro-optical material in the bifurcated region of the optical waveguide to sample the optical signal-under-test.

2. An optical domain optical signal sampling device, comprising:

an electrical sampling pulse source comprising a photoconductive switch having an output, and operable to generate electrical sampling pulses:

an electrically-controlled optical modulator comprising electro-optical material, an optical waveguide located in the electro-optical material and including a bifurcated region, and electrodes disposed along the bifurcated region, the optical waveguide arranged to receive an optical signal-under-test, at least one of the electrodes connected to receive the electrical sampling pulses from the output of the photoconductive switch, the electrical sampling pulses generating between the electrodes an electric field that differentially changes the refractive index of the electro-optical material in the bifurcated region of the optical waveguide to sample the optical signal-under-test.

3. The optical domain optical signal sampling device of claim 2, in which:

the optical domain optical signal sampling device additionally comprises a DC bias supply connected to at least one of the electrodes to bias the refractive index of the electro-optical material in the bifurcated region of the optical waveguide to a state that sets the electrically-controlled optical modulator to a normally-OFF state; and the sampling pulses momentarily switch the electrically-controlled optical modulator ON.

4. The optical domain optical signal sampling device of claim 2, in which:

the optical domain optical signal sampling device additionally comprises a substrate in and on which the electrically-controlled optical modulator is formed; and the electrical sampling pulse source is mounted on the substrate.

5. The optical domain optical signal sampling device of claim 2, in which:

the photoconductive switch additionally includes an input; and the electrical sampling pulse source additionally includes a DC sampling voltage source connected to the input of the photoconductive switch.

6. An optical domain optical signal sampling device comprising:

an electrical sampling pulse source;

a first electrically-controlled optical modulator comprising electro-optical material, an optical waveguide located in the electro-optical material and including a bifurcated region, and electrodes disposed along the bifurcated region, the optical waveguide arranged to receive an optical signal-under-test, at least one of the electrodes connected to receive electrical sampling pulses from the electrical sampling pulse source, the electrical sampling pulses generating between the electrodes an electric field that differentially changes the refractive index of the electro-optical material in the bifurcated region of the optical waveguide to sample the optical signal-under-test;

a second electrically-controlled optical modulator in tandem with the first electrically-controlled optical modulator; and a DC bias supply connected to set the first electrically-controlled optical modulator and the second electrically-controlled optical modulator to opposite states; in which:

the electrical sampling pulse source is structured to provide first electrical sampling pulses to the first electrically-controlled optical modulator and second sampling pulses, delayed relative to the first electrical sampling pulses, to the second electrically-controlled optical modulator, the electrical sampling pulses momentarily reversing the states of the first electrically-controlled optical modulator and the second electrically-controlled optical modulator.

7. The optical domain optical signal sampling device of claim 6, in which:

the electrical sampling pulses have a pulse width; and the second electrical sampling pulses are delayed relative to the first electrical sampling pulses by less than the pulse width.

8. The optical domain optical signal sampling device of claim 6, in which the electrical sampling pulse source includes a photoconductive switch having an output connected to the first electrically-controlled optical modulator and to the second electrically-controlled optical modulator by electrical paths of different path lengths.

9. The optical domain optical signal sampling device of claim 6, in which the electrical sampling pulse source includes:

a first photoconductive switch having an output connected to the first electrically-controlled optical modulator; and a second photoconductive switch having an output connected to the second electrically-controlled optical modulator.

10. The optical domain optical signal sampling device of claim 1, in which:

the optical waveguide additionally includes a output; and the optical domain optical signal sampling device additionally comprises a photodetector coupled to the output of the optical waveguide.

11. An optical domain optical signal sampling device, comprising:

an electrical sampling pulse source;

an electrically-controlled optical modulator comprising electro-optical material, an optical waveguide located in the electro-optical material and including a bifurcated region, and electrodes disposed along the bifurcated region, the optical waveguide arranged to receive an optical signal-under-test and comprising an output, at least one of the electrodes connected to receive electrical sampling pulses from the electrical sampling pulse source, the electrical sampling pulses generating between the electrodes an electric field that differentially changes the refractive index of the electro-optical material in the bifurcated region of the optical waveguide to sample the optical signal-under-test;

a photodetector coupled to the output of the optical waveguide, the photodetector including a first electrical output;

an optical tap, including an input arranged to receive the optical signal-under-test, a secondary output, and a main output optically coupled to the optical waveguide;

a correction signal generator comprising a serial arrangement of an auxiliary photodetector and a controlled attenuator, the correction signal generator being optically coupled to the secondary output of the optical tap and including a control input and a second electrical output; and a differential amplifier including inputs electrically connected to the first and second electrical outputs, respectively, and an output that provides electrical samples of the optical signal-wider-test and that is additionally connected to the control input of rite correction signal generator.

12. The optical domain optical signal sampling device of claim 11, in which:
the auxiliary photodetector is optically coupled to the secondary output of the optical tap; and
the attenuator is an electrical attenuator.

13. The optical domain optical signal sampling device of claim 11, in which the attenuator is an optical attenuator and includes an input optically coupled to the secondary output of the optical tap, and an output optically coupled to the auxiliary photodetector.

14. An optical domain optical signal sampling device, comprising:
a photoconductive switch;
a light source operable to generate optical pulses and arranged to illuminate the photoconductive switch with the optical pulses to cause the photoconductive switch to generate electrical sampling pulses; and
an electrically-controlled optical modulator comprising electro-optical material, an optical waveguide located in the electro-optical material and including a bifurcated region, and electrodes disposed along the bifurcated region, the optical waveguide arranged to receive an optical signal-under-test, at least one of the electrodes connected to receive the electrical sampling pulses from the photoconductive switch, the electrical sampling pulses generating an electric field between the electrodes that differentially changes the refractive index of the electro-optical material in the bifurcated region of the optical waveguide to sample the optical signal-under-test.

15. The optical domain optical signal sampling device of claim 14, in which:
the optical domain optical signal sampling device additionally comprises a DC bias supply connected to at least one of the electrodes to bias the refractive index of the electro-optical material in the bifurcated region of the optical waveguide to a state that sets the electrically-controlled optical modulator to a normally-OFF state; and
the electrical sampling pulses momentarily switch the electrically-controlled optical modulator ON.

16. The optical domain optical signal sampling device of claim 14, in which:
the optical domain optical signal sampling device additionally comprises a substrate in and on which the electrically-controlled optical modulator is formed; and
the photoconductive switch is mounted on the substrate.

17. The optical domain optical signal sampling device of claim 14, additionally comprising a DC sampling voltage source connected to the photoconductive switch.

18. The optical domain optical signal sampling device of claim 14, in which:
the electrically-controlled optical modulator is a first electrically-controlled optical modulator;
the optical domain optical signal sampling device additionally comprises:
a second electrically-controlled optical modulator in tandem with the first electrically-controlled optical modulator, and
a DC bias supply connected to set the first electrically-controlled optical modulator and the second electrically-controlled optical modulator to opposite states; and the photoconductive switch is included in a dual electrical sampling pulse source structured to provide first electrical sampling pulses to the first electrically-controlled optical modulator and second sampling pulses, delayed relative to the first electrical sampling pulses, to the second electrically-controlled optical modulator, the electrical sampling pulses momentarily reversing the states of the first electrically-controlled optical modulator and the second electrically-controlled optical modulator.

19. The optical domain optical signal sampling device of claim 18, in which:
the electrical sampling pulses have a pulse width; and
the second electrical sampling pulses are delayed relative to the first electrical sampling pulses by less than the pulse width.

20. The optical domain optical signal sampling device of claim 18, in which the photoconductive switch includes an output connected to the first electrically-controlled optical modulator and to the second electrically-controlled optical modulator by electrical paths having different path lengths.

21. The optical domain optical signal sampling device of claim 18, in which:
the photoconductive switch is a first photoconductive switch and includes an output connected to the electrodes of the first electrically-controlled optical modulator;
the dual electrical sampling pulse source additionally includes a second photoconductive switch including an output connected to the electrodes of the second electrically-controlled optical modulator; and
the light source includes:
an optical pulse source arranged to illuminate the first photoconductive switch, and
an optical delay arranged to receive light from the optical pulse source and to illuminate the second photoconductive switch.

22. The optical domain optical signal sampling device of claim 21, in which the optical delay includes an optical waveguide.

23. The optical domain optical signal sampling device of claim 14, in which:
the optical waveguide includes an output; and
the optical domain optical signal sampling device additionally comprises a photodetector coupled to the output.

24. The optical domain optical signal sampling device of claim 23, in which:
the photodetector includes a first electrical output; and
the optical domain optical signal sampling device additionally comprises:
an optical tap, including an input arranged to receive the optical signal-under-test, a secondary output, and a main output optically coupled to the optical waveguide,
a correction signal generator comprising a serial arrangement of an auxiliary photodetector and a controlled attenuator, the correction signal generator being optically coupled to the secondary output of the optical tap and including a control input and a second electrical output, and a differential amplifier including inputs electrically connected to the first and second electrical outputs, respectively, and an output that provides electrical samples of the optical signal-under-test and that is additionally connected to the control input of the correction signal generator.

25. The optical domain optical signal sampling device of claim 24, in which:

the auxiliary photodetector is optically coupled to the secondary output of the optical tap; and the controlled attenuator is an electrical attenuator.

26. The optical domain optical signal sampling device of claim 24, in which the controlled attenuator is an optical attenuator and includes an input optically coupled to the secondary output of the optical tap, and an output optically coupled to the auxiliary photodetector.

* * * * *